United States Patent [19]

Rose et al.

[11] Patent Number: 4,860,989
[45] Date of Patent: Aug. 29, 1989

[54] QUICKIE MIRROR

[76] Inventors: James H. Rose, c/o George Spector, 233 Broadway, Rm. 3815; George Spector, 233 Broadway, Rm. 3815, both of, New York, N.Y. 10007

[21] Appl. No.: 43,367
[22] Filed: Apr. 28, 1987
[51] Int. Cl.[4] .......................... A47F 7/00; A47G 1/16
[52] U.S. Cl. .................... 248/471; 248/444; 248/478; 248/480; 248/279; 350/634
[58] Field of Search ............. 248/471, 478, 480, 481, 248/124, 106, 105, 279, 287, 157, 518, 407, 414, 126; 350/636, 638, 634

[56] References Cited

U.S. PATENT DOCUMENTS

| 185,004 | 12/1876 | White | 248/124 |
| 896,269 | 8/1908 | Birdwell | 350/638 |
| 956,032 | 4/1910 | Birdwell | 350/638 |
| 956,274 | 4/1910 | Birdwell | 350/638 |
| 1,130,689 | 3/1915 | Atkinson | 248/480 |
| 1,260,095 | 3/1918 | Timberlake | 248/469 |
| 2,176,252 | 10/1939 | Favata | 350/638 X |
| 2,266,977 | 12/1941 | Lynch | 350/638 |
| 3,874,623 | 4/1975 | Moulton | 248/121 |
| 4,064,625 | 12/1977 | Mansfield | 248/121 X |

FOREIGN PATENT DOCUMENTS

| 160224 | 12/1954 | Australia | 350/638 |
| 797548 | 4/1936 | France | 248/124 |
| 313265 | 6/1929 | United Kingdom | 350/638 |

Primary Examiner—Ramon S. Britts
Assistant Examiner—Karen J. Chotkowski

[57] ABSTRACT

A mirror support structure is provided and consists of a framework that is adjustable and can be worn on the shoulders of a person using the mirror so that both hands can be free for other uses. In another form the framework can stand on a flat surface.

1 Claim, 1 Drawing Sheet

U.S. Patent      Aug. 29, 1989      4,860,989
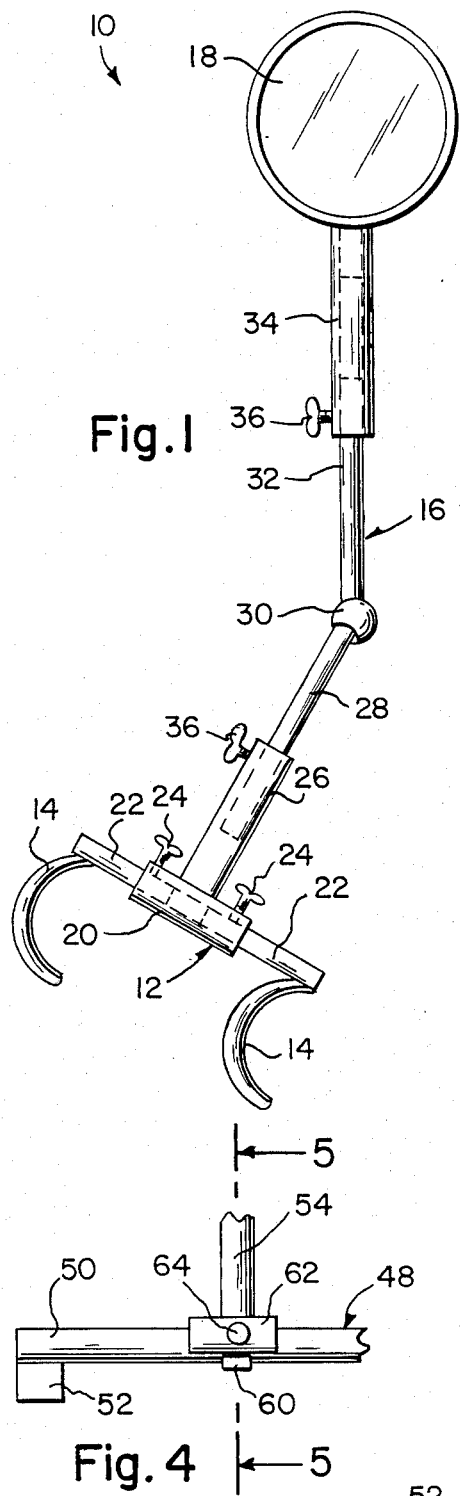
Fig. 1
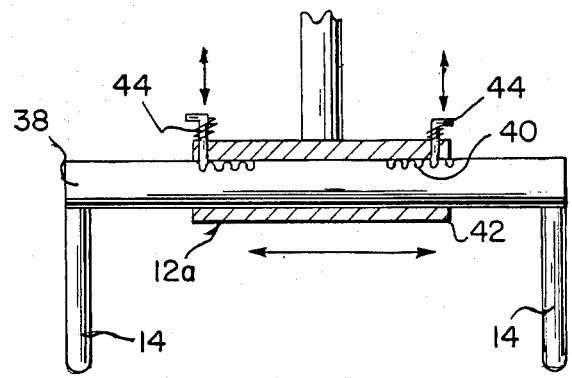
Fig. 2
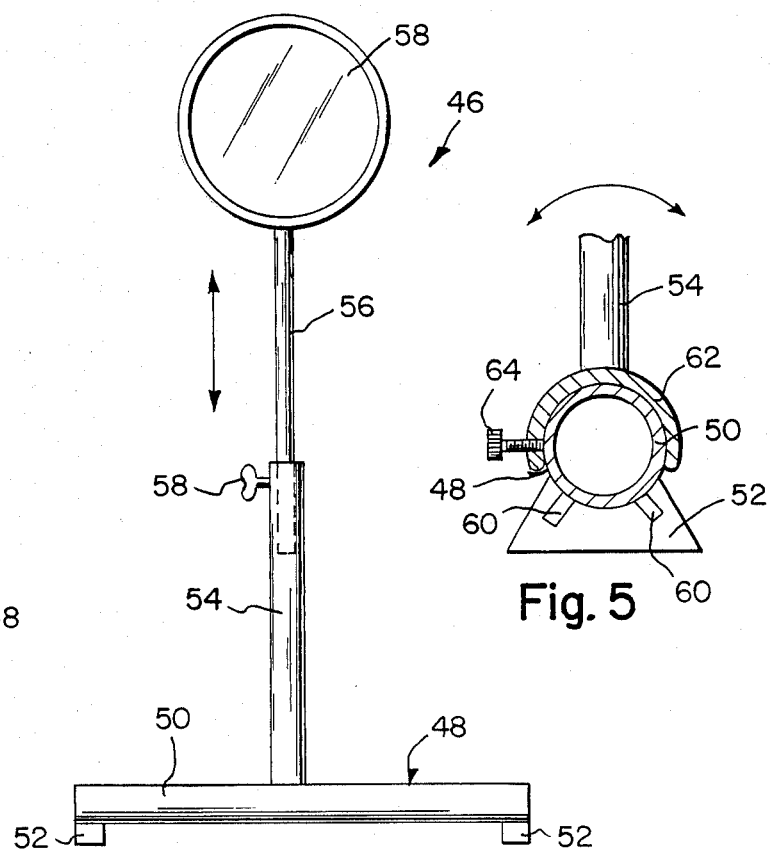
Fig. 3
Fig. 4
Fig. 5

QUICKIE MIRROR

BACKGROUND OF THE INVENTION

The instant invention relates generally to mirrors and more specifically it relates to a mirror support structure.

Numerous mirrors have been provided in prior art that are adapted to include brackets for supporting the mirrors in stationary positions. For example, U.S. Pat. Nos. 956,032; 956,274 and 3,781,093 all are illustrative of such prior art. While these units may be suitable for the particular purpose to which they address, they would not be as suitable for the purposes of the present invention as heretofore described.

SUMMARY OF THE INVENTION

A primary object of the present invention is to provide a mirror support structure that will overcome the shortcomings of the prior art devices.

Another object is to provide a mirror support structure that is adjustable and can be worn on the shoulders of a person using the mirrors so that bath hands can be completely free.

An additional object is to provide a mirror support structure that is adjustable and can stand on a flat surface so that a person using the mirror can have both hands completely free.

A further object is to provide a mirror support structure that is simple and easy to use.

A still further object is to provide a mirror support structure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the body mounted unit of the invention.

FIG. 2 is a front view with parts broken away of a modification of the unit of FIG. 1 showing an adjustment feature therein.

FIG. 3 is a front elevational view of the floor stand unit of the invention.

FIG. 4 is a front elevational view with parts broken away of a modification of the unit.

FIG. 5 is an enlarged cross sectional view taken along line 5—5, in FIG. 4 showing the adjustment feature in greater detail.

DETAILED DESCRIPTION OF THE PREFERRED EMBODIMENTS

Turning now descriptively to the drawings, in which similar reference characters denote similar elements throughout the several views, FIG. 1 illustrates a mirror support structure 10 consisting of an adjustable rod 12 to extend across chest of a person (not shown). A pair of hook members 14 are also provided. Each hook member 14 is attached to one end of the adjustable rod 12. The hook members 14 are worn on shoulders of the person. A telescoping and angle adjustment retaining unit 16 extends outwardly from the adjustable rod 12. A mirror 18 is attached to the retaining unit 16. The mirror 18 is positionable away from the person so that hands of the person are free for other uses than holding and positioning the mirror 18.

The adjustable rod 12 contains a central sleeve member 20 and a pair of shafts 22. Each of the shafts 22 adjustably extends outwardly from each end of the sleeve member 20 with one remote end attached to one of the hook members 14. A pair of wing bolts 24 are provided. Each of the wing bolts 24 is threaded into each end of the sleeve member 20 for holding each of the shafts 22 stationary after positioned thereto.

The telescoping and angle adjustment retaining unit 16 contains a first hollow tube 26 transversely attached at one end to the central sleeve member 20 of the adjustable rod 12. A first arm 28 adjustably extends outwardly from free end of the first hollow tube 26. A ball joint 30 is attached to end of the first arm 28. A second arm 32 has an end attached to the ball joint 30 for angle adjustment thereto. A second hollow tube 34 has a free end slideably inserted over other end of the second arm 32 with other end attached to the mirror 18 A pair of wing bolts 36 are also provided. One of the Wing bolts 36 is threaded into the free end of the first hollow tube 26 while other of the wing bolts 36 is threaded into the free end of the second hollow tube 34 for holding each of the arms 28, 32 stationary after positioned thereto.

FIG. 2 shows a modified adjustable rod 12a containing a shaft 38 that has a plurality of spaced apart indents 40 therein. Each remote end of the shaft 38 is attached to one of the hook members 14. A sleeve member 42 is adjustably positioned onto the shaft 38. A pair of inverted spring biased L-shaped pins 44 are provided. Each of the pins 44 extends into each end of the sleeve member 42 and one of the indents 40 on the shaft 38 for holding the sleeve member 42 stationary after positioned thereto.

FIG. 3 another type of mirror support structure 46 consisting of a base stand 48 being an elongated pipe 50 that has a pair of stabilizing legs 52 to sit upon a flat surface (not shown). Each leg 52 is mounted on each end of the pipe 50. A hollow arm 54, centrally extends away from the pipe 50 along an axis normal to horizontal plane of the base stand 48. An adjustable arm 56 extends upwardly and outwardly from the hollow arm 54. A wing bolt 58 is threaded into end of the hollow arm 54 for holding the adjustable arm 56 stationary after positioned thereto. A mirror 58 is attached to upper end of the adjustable arm 56 so that hands of a person can be free for other uses than holding and positioning the mirror 58.

FIG. 4 and 5 show a modification of the structure in FIG. 3. A pair of spaced apart stop members 60 extend from predetermined places on circumference of the pipe 50. A C-shaped socket 62 is pivotly mounted over the pipe 50 to move between the stop members 60 with the hollow arm 54 transversely attached to the C-shaped socket 62, so that the hollow arm 54 can be angularly positioned from a vertical axis. A set screw 64 is threaded into the C-shaped socket 62 for holding the C-shaped socket stationary after positioned thereto.

While certain novel features of this invention have been shown and described and are pointed out in the annexed claims, it will be understood that various omissions, substitutions and changes in the forms and details of the device illustrated and operation can be made by those skilled in the art without departing from the spirit of the invention.

What is claimed is:

1. A mirror stand being an elongated pipe with ends mounted on axially symmetrical spaced supports at said ends adapted to sit upon a flat surface;
   (a) a hollow arm centrally extending away from said pipe along an axis normal to horizontal plane of said base stand;
   (b) an adjustable arm extending upwardly and outwardly from said hollow arm;
   (c) a wing bolt threaded into end of said hollow arm for holding said adjustable arm stationary after positioned thereto;
   (d) a mirror attached to upper end of said adjustable arm so that hands of a person can be free to other uses than holding and positioning said mirror;
   (e) a pair of spaced stop members extending radially from predetermined places on circumference of said pipe;
   (f) a C-shaped sleeve having opposite longitudinal edges pivotally mounted on said pipe whereby said sleeve pivots about the pipe axis between said stop members, said hollow arm being transversely attached to said C-shaped sleeve so that said hollow arm can be angularly positioned on said pipe; and
   (g) a set screw threaded into said C-shaped sleeve for holding said C-shaped socket stationary after positioned thereto.

* * * * *